(12) United States Patent
Munakata et al.

(10) Patent No.: US 12,553,954 B2
(45) Date of Patent: Feb. 17, 2026

(54) BATTERY STATE DETERMINATION METHOD AND BATTERY STATE DETERMINATION DEVICE

(71) Applicant: TOYO SYSTEM CO., LTD., Iwaki (JP)

(72) Inventors: Ichiro Munakata, Fukushima (JP); Shuntaro Igari, Fukushima (JP); Satoshi Tanno, Fukushima (JP); Hideki Shoji, Fukushima (JP)

(73) Assignee: TOYO SYSTEM CO., LTD., Fukushima (JP)

( * ) Notice: Subject to any disclaimer, the term of this patent is extended or adjusted under 35 U.S.C. 154(b) by 422 days.

(21) Appl. No.: 18/023,383

(22) PCT Filed: Mar. 1, 2022

(86) PCT No.: PCT/JP2022/008641
§ 371 (c)(1),
(2) Date: Feb. 27, 2023

(87) PCT Pub. No.: WO2022/244378
PCT Pub. Date: Nov. 24, 2022

(65) Prior Publication Data
US 2024/0027535 A1 Jan. 25, 2024

(30) Foreign Application Priority Data
May 19, 2021 (JP) .................. 2021-084826

(51) Int. Cl.
*G01R 31/392* (2019.01)
*G01R 31/367* (2019.01)
*G01R 31/396* (2019.01)

(52) U.S. Cl.
CPC ......... *G01R 31/392* (2019.01); *G01R 31/367* (2019.01); *G01R 31/396* (2019.01)

(58) Field of Classification Search
CPC .. G01R 31/392; G01R 31/367; G01R 31/396; G01R 31/382; G01R 31/389; H01M 10/42; H01M 10/48; H01M 10/486; Y02E 60/10
See application file for complete search history.

(56) References Cited

U.S. PATENT DOCUMENTS 8,742,728 B2 6/2014 Sasaki et al.
9,952,289 B2 4/2018 Hanyu et al.
(Continued)

FOREIGN PATENT DOCUMENTS

CN 106405434 A 2/2017
CN 112269137 A * 1/2021 ........... G01R 31/392
(Continued)

OTHER PUBLICATIONS

International Search Report (ISR) (and English translation thereof) dated Apr. 5, 2022, issued in International Application No. PCT/JP2022/008641.
(Continued)

*Primary Examiner* — Catherine T. Rastovski
*Assistant Examiner* — Lal Ce Mang
(74) *Attorney, Agent, or Firm* — Holtz, Holtz & Volek PC

(57) ABSTRACT

A device is capable of evaluating the degree of deterioration of a secondary battery by executing regression analysis processing using, as a target variable, the degree of deterioration of the secondary battery. Multiple regression analysis is executed by using, as explanatory variables, respective values of plural model parameters that define a secondary battery model based on a measurement result of complex impedance of each reference secondary battery, and a degree of deterioration evaluated according to the secondary battery model as a target variable. Then, a degree of deterioration of a target secondary battery is evaluated according to a mul-
(Continued)

tiple regression equation obtained as a result of the multiple regression analysis.

10 Claims, 8 Drawing Sheets

(56) References Cited

U.S. PATENT DOCUMENTS

| | | | |
|---|---|---|---|
| 11,215,675 | B2 | 1/2022 | Shin et al. |
| 11,422,194 | B2 | 8/2022 | Oyama et al. |
| 2005/0099162 | A1* | 5/2005 | Ding ................. H02J 7/00711 320/141 |
| 2012/0081077 | A1 | 4/2012 | Sasaki et al. |
| 2012/0112754 | A1 | 5/2012 | Kawai |
| 2013/0030736 | A1* | 1/2013 | Tanaka ................. G01R 31/392 702/63 |
| 2013/0069660 | A1* | 3/2013 | Bernard ............... G01R 31/367 324/430 |
| 2014/0218042 | A1* | 8/2014 | Koba ................... G01R 31/367 324/430 |
| 2016/0116547 | A1 | 4/2016 | Hanyu et al. |
| 2016/0131719 | A1 | 5/2016 | Takahashi |
| 2020/0191876 | A1* | 6/2020 | Shin ................... G01R 31/3835 |
| 2020/0386820 | A1* | 12/2020 | Harper ................. B60L 58/16 |
| 2021/0382114 | A1 | 12/2021 | Oyama et al. |
| 2022/0317193 | A1* | 10/2022 | Munakata ............ G01R 31/385 |

FOREIGN PATENT DOCUMENTS

| | | | | |
|---|---|---|---|---|
| JP | H11233162 | A | | 8/1999 |
| JP | 2012013472 | A * | 1/2012 | ............ Y02E 60/10 |
| JP | 2012075298 | A | | 4/2012 |
| JP | 2012103131 | A | | 5/2012 |
| JP | 2015021774 | A | | 2/2015 |
| JP | 2016085166 | A | | 5/2016 |
| JP | 2018169161 | A | | 11/2018 |
| JP | 2020520461 | A | | 7/2020 |
| JP | 6842213 | B1 | | 3/2021 |
| WO | 2016121150 | A1 | | 8/2016 |
| WO | 2020090143 | A1 | | 5/2020 |

OTHER PUBLICATIONS

Written Opinion dated Apr. 5, 2022, issued in International Application No. PCT/JP2022/008641.
Extended European Search Report (EESR) dated Jun. 24, 2024, issued in counterpart European Application No. 22804299.0.

* cited by examiner

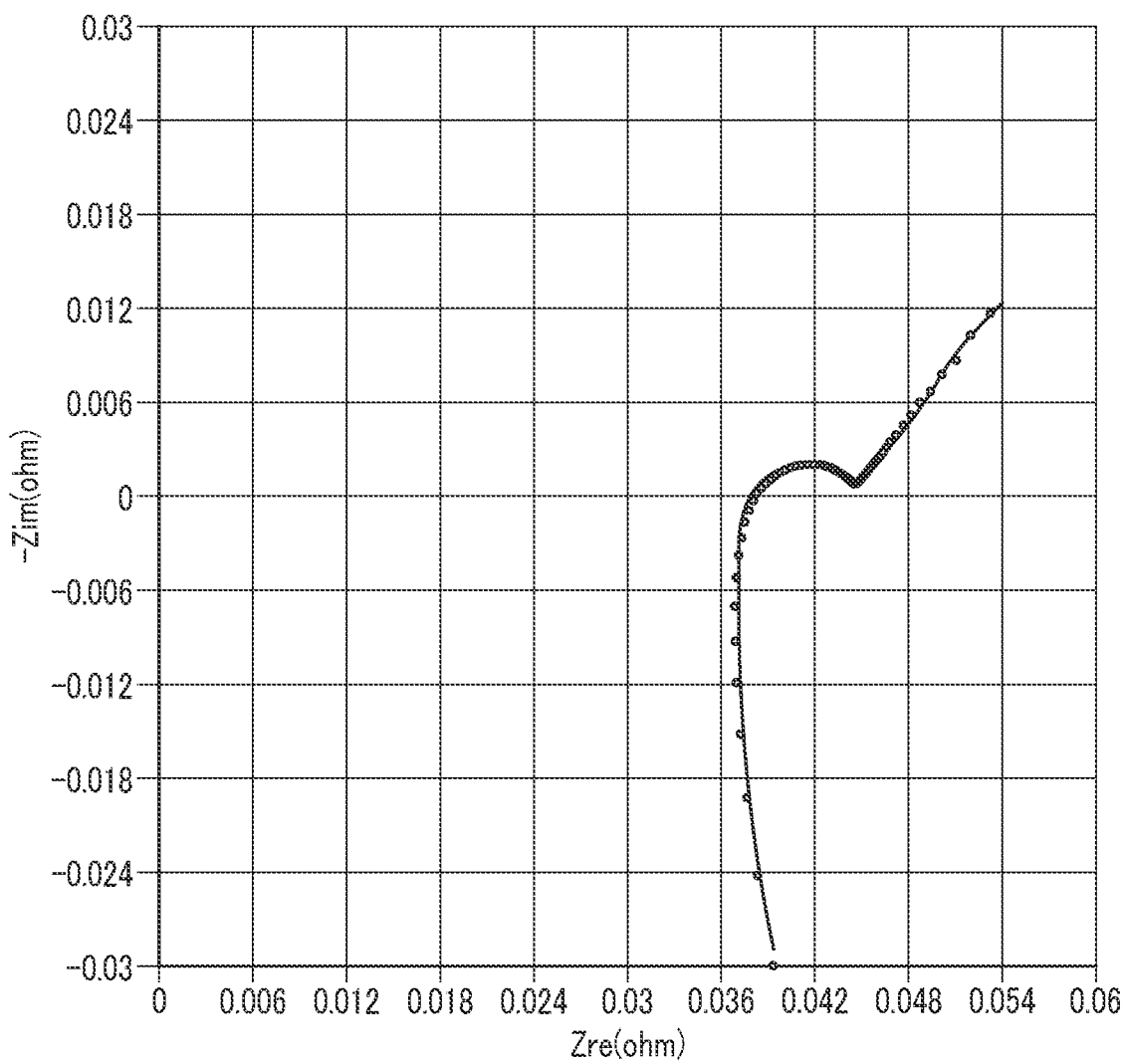

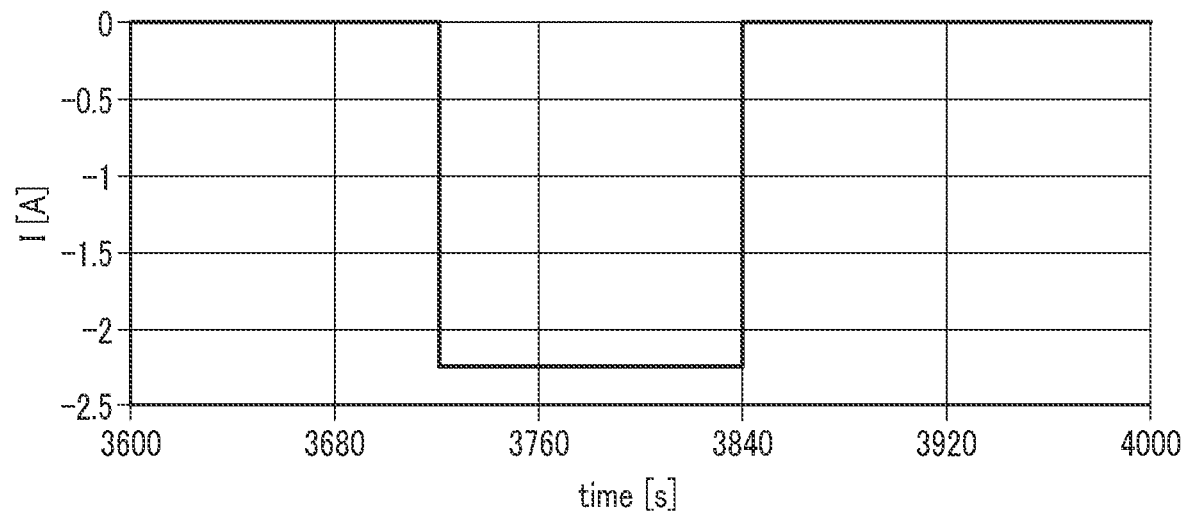
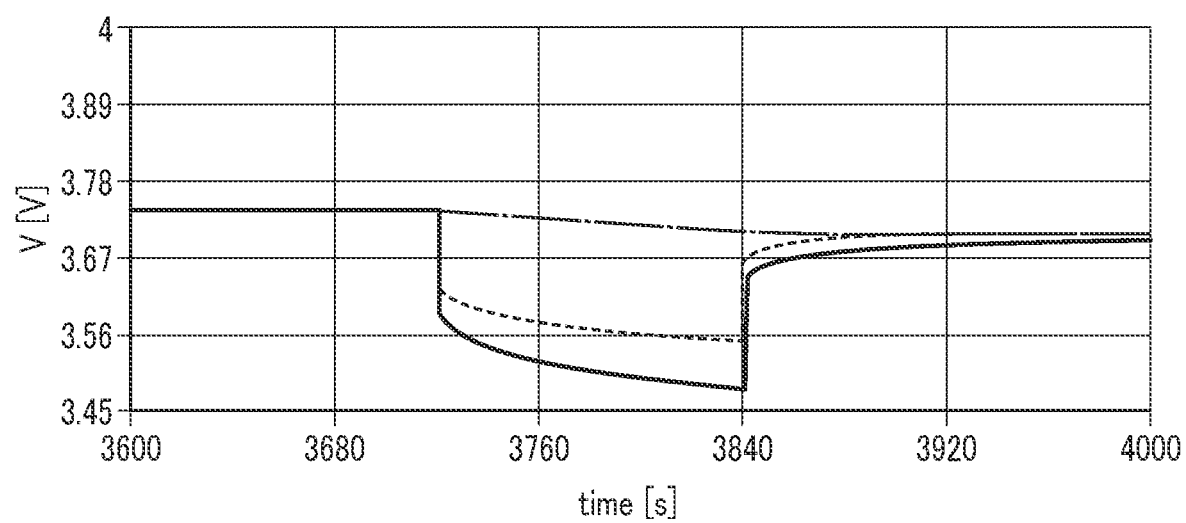

BATTERY STATE DETERMINATION METHOD AND BATTERY STATE DETERMINATION DEVICE

TECHNICAL FIELD

The present invention relates to a technique for evaluating the degree of deterioration of a secondary battery such as a lithium ion battery.

BACKGROUND ART

A method for estimating the deterioration state of a rechargeable battery that supplies power to a device is proposed (for example, see Patent Literature 1). In this method, a present model for a given battery is constructed from voltage measurements by using regression analysis. For example, the present model for the given battery is constructed by fitting the voltage measurements to an exponential function, filtering out the voltage measurements using the exponential function, and smoothing filtered voltage measurements with a moving average. The present model is compared with a set of fingerprints to estimate the deterioration state of the battery. Each fingerprint is linked to a given predetermined model for relaxation voltage of the battery to estimate the deterioration state quantified for the battery. Relaxation voltages of the battery at two or more points over a fixed period of time while the battery is resting are described by the given predetermined model.

CITATION LIST

Patent Literature

Published Japanese Translation of PCT application No. 2020-520461

SUMMARY OF INVENTION

Technical Problem

It is an object of the present invention to provide a device and the like capable of improving the evaluation accuracy of the degree of deterioration of a secondary battery by executing regression analysis processing with the degree of deterioration of the secondary battery as a target variable.

Solution to Problem

A battery state determination device according to the present invention includes:
  a first recognition element which recognizes a degree of deterioration of each of a plurality of reference secondary batteries manufactured to the same specifications, and each of values of plural model parameters that define a secondary battery model representing the internal resistance characteristics of each of the plurality of reference secondary batteries in association with each other;
  a multiple regression analysis element which defines a multiple regression equation by executing multiple regression analysis using the degree of deterioration of each of the plurality of reference secondary batteries as a target variable and the plural model parameters as explanatory variables based on the degree of deterioration of each of the plurality of reference secondary batteries and each of values of the plural model parameters recognized by the first recognition element in association with each other;
  a second recognition element which recognizes each of values of the plural model parameters based on an impedance measurement result of a target secondary battery manufactured to the same specifications as each of the plurality of reference secondary batteries; and
  a degree-of-battery deterioration evaluating element which evaluates a degree of deterioration of the target secondary battery according to the multiple regression equation defined by the multiple regression analysis element based on each of the values of the plural model parameters recognized by the second recognition element.

BRIEF DESCRIPTION OF DRAWINGS

FIG. 4 is an explanatory diagram related to Nyquist plots of the secondary battery.

FIG. 7A is an explanatory diagram related to an impulse current.

FIG. 7B is an explanatory diagram related to voltage response characteristics of the secondary battery and a secondary battery model.

DESCRIPTION OF EMBODIMENTS (Configuration of Battery State Determination Device)

Figure 1:
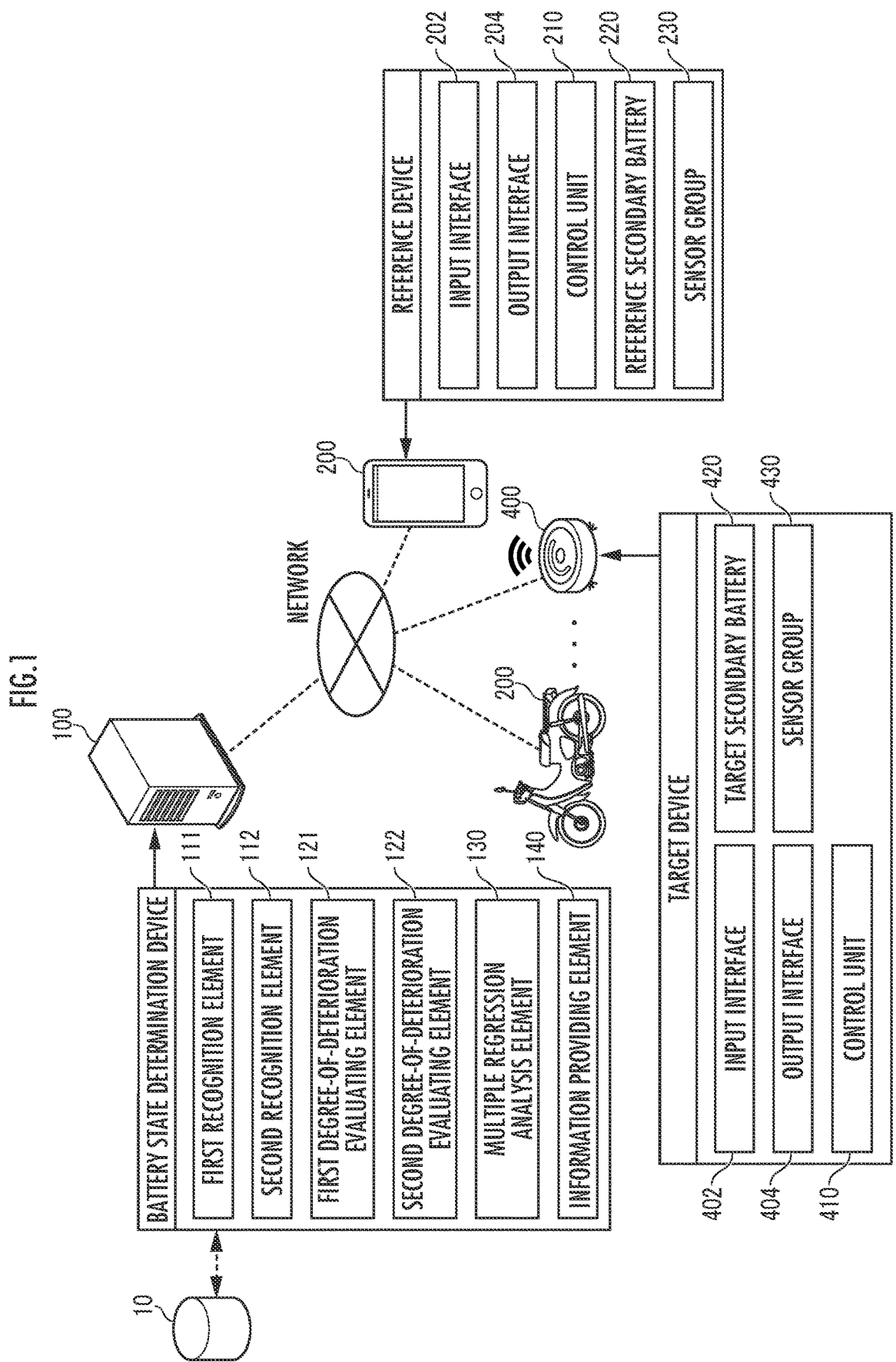
FIG. 1 is an explanatory diagram of the configuration of a battery state determination device as one embodiment of the present invention.

A battery state determination device 100 as one embodiment of the present invention illustrated in FIG. 1 is configured by one or more servers communicable with a database 10, and with each of reference devices 200 and a target device 400 through a network, respectively. Based on the evaluation result of the degree of deterioration of a reference secondary battery 220 as a power supply of each reference device 200, the battery state determination device 100 evaluates the degree of deterioration of a target secondary battery 420 installed as a power supply in the target device 400.

The battery state determination device 100 includes a first recognition element 111, a second recognition element 112, a first degree-of-deterioration evaluating element 121, a second degree-of-deterioration evaluating element 122, a multiple regression analysis element 130, and an information providing element 140. Each of the first recognition element 111, the second recognition element 112, the first degree-of-deterioration evaluating element 121, the second degree-of-deterioration evaluating element 122, the multiple regression analysis element 130, and the information providing element 140 is composed, respectively, of storage devices (such as memories like RAM, ROM, or EEPROM; SSD; or HDD) to store and hold programs (software) and data, an arithmetic processing unit (a single core processor, a multi-core processor, a CPU, or the like) to read a required program and/or data from a storage device to execute predetermined arithmetic processing, an I/O circuit, and the like.

In the storage devices, programs (software) are stored and held in addition to various data such as measurement results of the voltage response characteristics of each secondary battery 220 to an impulse current. For example, each of plural identifiers for identifying each secondary battery 220 or the type of each reference device 200 (specified by the standards and specifications thereof), in which the secondary battery 220 is installed, is stored and held in a memory in association with each of plural secondary battery models, respectively. The processor reads a required program and data from the memory to execute arithmetic processing according to the program based on the data, thereby executing the arithmetic processing or a task assigned to each of the elements 111, 112, 121, 122, 130, and 140, respectively, to be described later.

Each of the reference devices 200 includes an input interface 202, an output interface 204, a control unit 210, the reference secondary battery 220, and a sensor group 230. The reference devices 200 include all devices, such as a personal computer, a mobile phone (smartphone), a home appliance, and a mobile object like an electric bicycle, each of which uses the reference secondary battery 220 as a power supply.

The control unit 210 is composed of a processor (arithmetic processing unit), a memory (storage device), an I/O circuit, and the like. Various data such as the measurement results of the voltage response characteristics of the reference secondary battery 220 are stored and held in the memory or a storage device provided separately therefrom. The control unit 210 operates according to power supplied from the reference secondary battery 220 to control the operation of the reference device 200 in an energized state. The operation of the reference device 200 includes the operation of an actuator (electric actuator or the like) provided in the reference device 200. The processor of the control unit 210 reads a required program and data from the memory to execute assigned arithmetic processing assigned according to the program based on the data.

The reference secondary battery 220 is, for example, a lithium ion battery, but it may be any other secondary battery such as a nickel-cadmium battery. The sensor group 230 measures values of model parameters required to control the reference device 200 in addition to the voltage response characteristics and temperature of the reference secondary battery 220. For example, the sensor group 230 is composed of a voltage sensor, a current sensor, and a temperature sensor to output a signal according to the voltage, current, and temperature of the reference secondary battery 220, respectively.

The target device 400 includes an input interface 402, an output interface 404, a control unit 410, the target secondary battery 420, and a sensor group 430. The target device 400 may be any device including the target secondary battery 420 as a power supply such as a personal computer, a mobile phone (smartphone), a home appliance, or a mobile object like an electric bicycle.

The control unit 410 is composed of a processor (arithmetic processing unit), a memory (storage device), an I/O circuit, and the like. Various data such as the measurement results of the voltage response characteristics of the target secondary battery 420 are stored and held in the memory or a storage device provided separately therefrom. The control unit 410 operates according to power supplied from the target secondary battery 420 to control the operation of the target device 400 in the energized state. The operation of the target device 400 includes the operation of an actuator (electric actuator or the like) provided in the target device 400. The processor of the control unit 410 reads a required program and data from the memory to execute arithmetic processing assigned according to the program based on the data.

The target secondary battery 420 is, for example, a lithium ion battery, but it may be any other secondary battery such as a nickel-cadmium battery. The sensor group 430 measures values of model parameters required to control the target device 400 in addition to the voltage response characteristics and temperature of the target secondary battery 420. For example, the sensor group 430 is composed of a voltage sensor, a current sensor, and a temperature sensor to output a signal according to the voltage, current, and temperature of the target secondary battery 420, respectively.

The battery state determination device 100 may also be installed in each of the reference devices 200 and/or the target device 400. In this case, a software server (not illustrated) transmits deterioration determination software to an arithmetic processing unit of the control unit 210 and/or 410 included in the reference device 200 and/or the target device 400. Thus, the functionality as the battery state determination device 100 may also be given to the arithmetic processing unit.

(Battery State Determination Method)

A determination method of the battery state of the target secondary battery 420 executed by the battery state determination device 100 having the configuration mentioned above will be described below.

(Recognition of Measurement Result of Complex Impedance)

Figure 2:
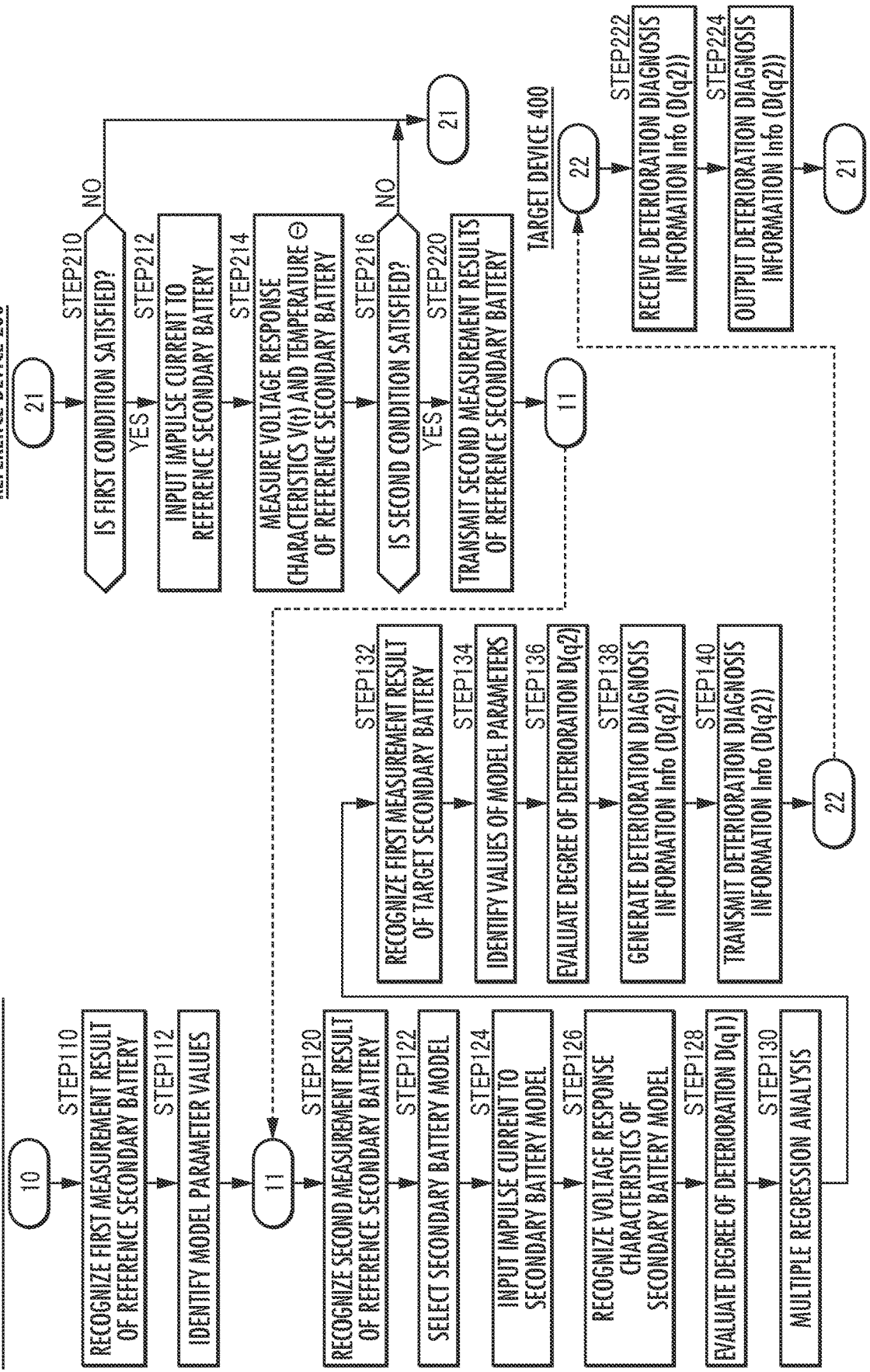
FIG. 2 is a flowchart illustrating the procedure of a battery state determination method of a secondary battery.

In the battery state determination device 100, the measurement result of complex impedance Z of each of various types of reference secondary batteries 220 is recognized by the first recognition element 111 (FIG. 2/STEP 110). The fact that each element "recognizes" information means to receive information, search for or read information from a source of information like the database 10, and execute every arithmetic processing in order to prepare necessary information, such as to calculate, estimate, identify, or estimate the information based on other information. The complex impedance Z of each reference secondary battery 220 is measured by an AC impedance method, and the measurement result is registered in the database 10 in association with an identifier for identifying the type of reference secondary battery 220.

Figure 3:
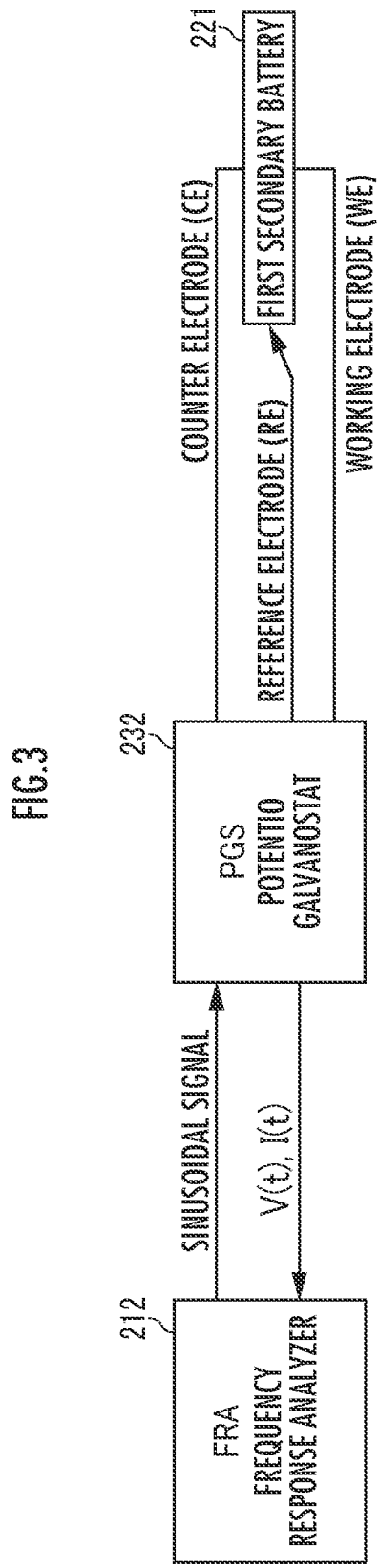
FIG. 3 is an explanatory diagram related to a measurement system of complex impedance of the secondary battery.

According to the AC impedance method, as illustrated in FIG. 3, a combination of a frequency response analyzer (FRA) 212 and a potentiogalvanostat (PGS) 232 is used. A sinusoidal signal of any frequency is output from an oscillator included in the FRA 212, and a current signal I(t) and a voltage signal V(t) of the first secondary battery 221 according to the sinusoidal signal are input from the PGS 232 to the FRA 212. Then, in the FRA 212, the current signal I(t) and the voltage signal V(t) are transformed into data in a frequency domain by the discrete Fourier frequency transform to measure complex impedance Z at frequency $f=(\omega/2\pi)$.

For example, the complex impedance Z of the reference secondary battery 220 that is not installed in the reference device 200 immediately before the shipment of the reference secondary battery 220 or the like is measured. In addition, the complex impedance Z of the reference secondary battery 220 as a reference secondary battery 220 in a state of being installed in the reference device 200 may also be measured. In this case, the FRA 212 may be configured by the control unit 210, and the sensor group 230 may be configured by the PGS 232. For example, the reference device 200 can be connected to a power supply such as a commercial power supply to charge the reference secondary battery 220 so that a sinusoidal signal will be output by power supplied from the power supply.

In FIG. 4, an example of Nyquist plots representing the measurement result of complex impedance Z of the reference secondary battery 220 is illustrated together with an approximate curve of the plots. The horizontal axis is the real part ReZ (Z re (ohm) in FIG. 4) of complex impedance Z, and the vertical axis is the imaginary part −ImZ (−Z im (ohm) in FIG. 4) of complex impedance Z. The complex impedance Z of lower frequencies is represented as ReZ increases in an area of −ImZ>0. The value of ReZ when −ImZ=0 corresponds to a transfer resistance in the electrolyte of the reference secondary battery 220. The curvature radius of a substantially semicircular section in the area of −ImZ>0 corresponds to the charge transfer resistance of the reference secondary battery 220. The curvature radius tends to be smaller as the temperature Θ of the reference secondary battery 220 rises. The effect of Warburg impedance of the reference secondary battery 220 is reflected in a liner section rising at about 45° in a low frequency domain of the area of −ImZ>0.

(Identification of Model Parameters for Defining Secondary Battery Model)

In the battery state determination device 100, the value of each of plural model parameters for defining a secondary battery model is identified by the first recognition element 111 based on the measurement result of complex impedance Z of the reference secondary battery 220, respectively (FIG. 2/STEP 112).

The secondary battery model is a model representing the voltage V(t) output from the reference secondary battery 220 when the current I(t) is input to the reference secondary battery 220. The voltage V(t) of the reference secondary battery 220 is defined by a relational expression (01) using a transfer function H(t) between open-circuit voltage OCV and internal resistance.

$$V(t)=OCV(t)+H(t)\cdot I(t) \quad (01)$$

Here, OCV(t) represents that the open-circuit voltage increases and/or decreases with charging and/or discharging of the current I(t).

A transfer function H(z) of an equivalent circuit model of the internal resistance of the reference secondary battery 220 is defined by a relational expression (02).

$$H(t)=H_L(t)+H_W(t)+\Sigma_{i=1}^{m}H_i(t)+H_0(t) \quad (02)$$

"$H_0(t)$," "$H_i(t)$," "$H_W(t)$," and "$H_L(t)$" are defined by model parameters representing the characteristics of the internal resistance of the secondary battery.

Figure 5A:
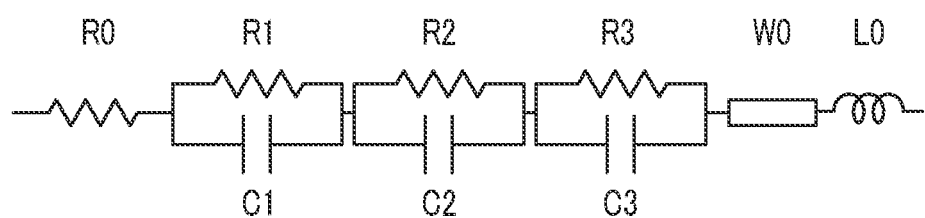
FIG. 5A is an explanatory diagram illustrating a first example of an equivalent circuit of the internal resistance of the reference secondary battery.
Figure 5B:
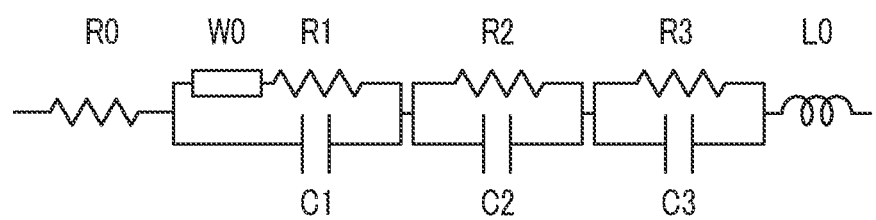
FIG. 5B is an explanatory diagram illustrating a second example of the equivalent circuit of the internal resistance of the reference secondary battery.

In FIG. 5A, an example of the equivalent circuit of the internal resistance of the reference secondary battery 220 is illustrated. In this example, the equivalent circuit of the internal resistance is defined by a resistor $R_0$ corresponding to the transfer resistance in the electrolyte, the i-th RC parallel circuit (i=1, 2, ..., m) composed of a resistor $R_i$ and a capacitor $C_i$, corresponding to the charge transfer resistance, and a series circuit of a resistor $W_0$ corresponding to Warburg impedance and a coil L. The number of RC parallel circuits connected in series is "3" in the example illustrated in FIG. 5A, but it may also be less than 3 or more than 3. The resistor $W_0$ may also be connected in series to a resistor R in at least any one of the RC parallel circuits. Further, each capacitor C may be replaced with a CPE (Constant Phase Element). Further, as illustrated in FIG. 5B, the Warburg resistance W may be connected in series to a resistor R in at least any one of the RC parallel circuits (the first RC parallel circuit in the example of FIG. 5B).

The transfer function $H_0(z)$ of the resistor $R_0$ is defined by a relational expression (10).

$$H_0(z)=R_0 \quad (10)$$

Figure 6A:
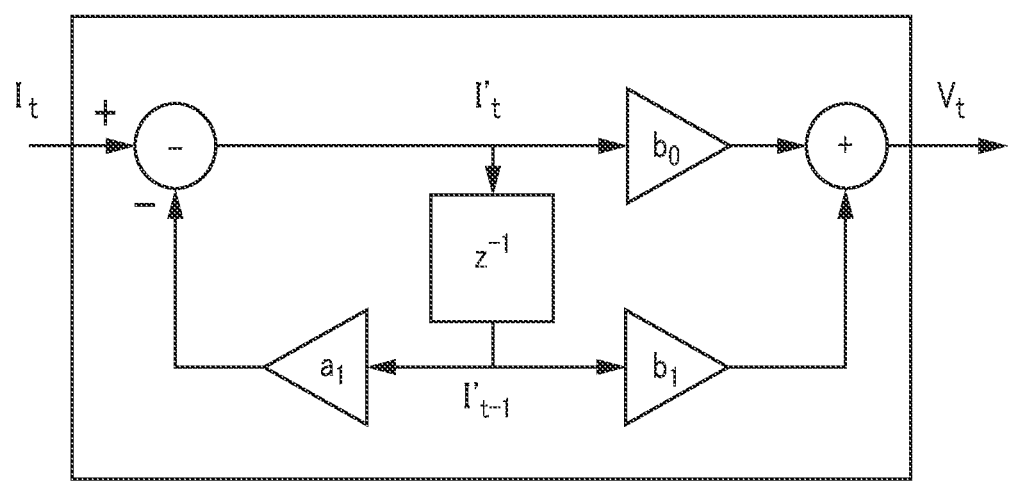
FIG. 6A is a diagram representing a transfer function of an IIR system.

The transfer function $H_i(z)$ of the i-th RC parallel circuit is defined by a relational expression (11) as a transfer function of an IIR (Infinite Impulse Response) system. In FIG. 6A, a block diagram representing the transfer function $H_i(z)$ of the i-th RC parallel circuit is illustrated.

$$H_i(z)=(b_{i0}+b_{i1}z^{-1})/(1+a_{i1}z^{-1}) \quad (11)$$

Figure 6B:
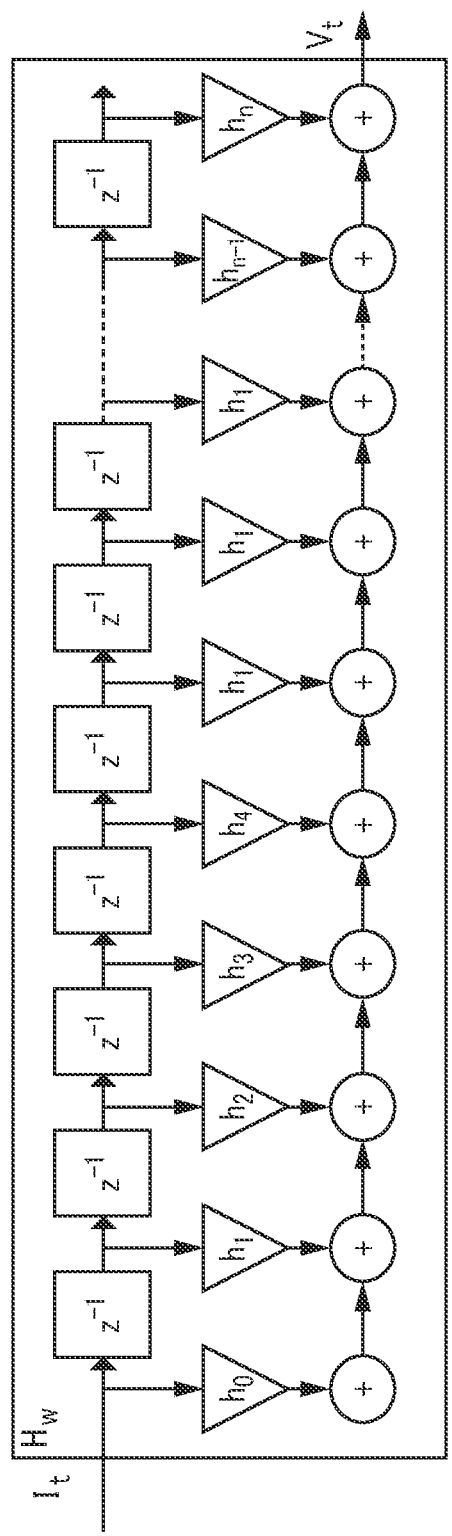
FIG. 6B is a diagram representing a transfer function of an FIR system.

A transfer function $H_W(z)$ of the resistor $W_0$ corresponding to Warburg impedance is defined by a relational expression (12) as a transfer function of an FIR (Finite Impulse Response) system. In FIG. 6B, a block diagram representing the transfer function $H_W(z)$ of the resistor $W_0$ corresponding to Warburg impedance is illustrated.

$$H_W(z)=\Sigma_{k=0}^{n}h_k z^{-k} \quad (12)$$

A transfer function $H_L(z)$ of the coil L is defined by a relational expression (13).

$$H_L(z)=(2L_0/T)(1-z^{-1})/(1+z^{-1}) \quad (13)$$

The approximate curve of the complex impedance Z of the reference secondary battery 220 represented by the Nyquist plots and indicated by the solid line in FIG. 4 is determined under the assumption that the transfer function H(z) of the equivalent circuit model of the internal resistance of the reference secondary battery 220 is defined according to the relational expression (02). Thus, the respective values of the plural model parameters $R_0$, $a_{i1}$, $b_{i0}$, $b_{i1}$, $h_k$, $L_0$, and T are determined (see the relational expressions (11), (12), and (13)). The value of the open-circuit voltage OCV in the secondary battery model is identified by the measured value of the open-circuit voltage OCV (see the relational expression (01)). Then, the secondary battery model is established for each of the various types of reference secondary batteries 220 according to the respective values of the plural model parameters, respectively.

(Degree-of-Deterioration Evaluation of Reference Secondary Battery)

In each reference device 200, it is determined by the control unit 210 in the energized state whether or not a first condition is satisfied (FIG. 2/STEP 210). As the "first condition," a condition that there is a specified operation in the reference device 200 through the input interface 202, a condition that the reference device 200 is connected to an external power supply to charge the reference secondary battery 220, or the like is adopted.

When it is determined that the first condition is not satisfied (FIG. 2/STEP 210 ... NO), the first condition satisfaction determining process is executed again (FIG. 2/STEP 210). Note that the first condition satisfaction determining process (FIG. 2/STEP 210) may be omitted.

When it is determined that the first condition is satisfied (FIG. 2/STEP 210 ... YES), an impulse current I(t) as illustrated in FIG. 7A is input to the reference secondary battery 220 (FIG. 2/STEP 212). A waveform signal of the impulse current I(t) may be specified by the second recognition element 112 by mutual communication between the battery state determination device 100 and the reference device 200. For example, a pulse current generator installed in the reference device 200 is driven by power supplied from the external power supply to which the reference device 200 is connected. Thus, the impulse current I(t) generated by the pulse current generator is input to the reference secondary battery 220. An auxiliary power supply for impulse current generation may also be installed in the reference device 200.

Based on output signals of the sensor group 230, the voltage response characteristics V(t) and the temperature Θ of the reference secondary battery 220 are measured by the control unit 200 (FIG. 2/STEP 214). Thus, for example, the voltage response characteristics V(t) of the reference secondary battery 220 changing as indicated by the solid line in FIG. 7B are measured.

Subsequently, it is determined by the control unit 210 whether or not a second condition is satisfied (FIG. 2/STEP 216). As the "second condition," a condition that a waveform signal enough to identify the voltage response characteristics V(t) is acquired, a condition that the time reaches a second time point at which a certain amount of time has passed from a first time point at which it is finally determined that the first condition is satisfied, a condition that there is a request for the evaluation of the degree of battery deterioration of the reference secondary battery 220 through the input interface 202 in the reference device 200, or the like is adopted.

When it is determined that the second condition is not satisfied (FIG. 2/STEP 216 . . . NO), the first condition satisfaction determining process is executed again (FIG. 2/STEP 210). Note that the second condition satisfaction determining process (FIG. 2/STEP 216) may be omitted.

When it is determined that the second condition is satisfied (FIG. 2/STEP 216 . . . YES), the measurement results of the voltage response characteristics V(t) and the temperature Θ of the reference secondary battery 220 are transmitted from the reference device 200 to the battery state determination device 100 by a transmitter that constructs the reference output interface 202 (FIG. 2/STEP 220). On this occasion, an identifier ID for identifying the type (standards, specifications) of the reference secondary battery 220 is also transmitted from the reference device 200 to the battery state determination device 100. Further, measurement condition information for identifying the impulse current I(t) input to the reference secondary battery 220 when the voltage response characteristics V(t) are measured may be transmitted from the reference device 200 to the battery state determination device 100.

In the battery state determination device 100, the measurement results of the voltage response characteristics V(t) and the temperature η of the reference secondary battery 220 are recognized by the first recognition element 111 as second measurement results (FIG. 2/STEP 120).

From among many secondary battery models registered in the database 10, one secondary battery model is selected by the first degree-of-deterioration evaluating element 121, where the selected secondary battery model is associated respectively with an identifier ID attached to the second measurement results and the measurement result of the temperature Θ included in the second measurement results (FIG. 2/STEP 122).

Further, by the first degree-of-deterioration evaluating element 121, the impulse current I(t) is input to the selected secondary battery model (FIG. 2/STEP 124). The impulse current I(t) may be recognized based on a waveform signal specified by the first recognition element 211, or may be recognized based on the measurement condition information transmitted from the reference device 200 to the battery state determination device 100.

Voltage response characteristics $V_{model}(t)$ output from the secondary battery model are calculated by the first degree-of-deterioration evaluating element 121 as an output signal of the secondary battery model (FIG. 2/STEP 126). Thus, for example, the voltage response characteristics $V_{model}(t)$ of the secondary battery model changing as indicated by the dashed line in FIG. 7B are calculated as the output signal of the secondary battery model. In FIG. 7B, a changing state of the open-circuit voltage OCV(t) is indicated by the dash-dotted line.

Subsequently, based on the comparison results between the voltage response characteristics V(t) of the reference secondary battery 220 and the voltage response characteristics $V_{model}(t)$ of the secondary battery model, a degree of deterioration $D(q_1)$ of the reference secondary battery 220 is evaluated by the first degree-of-deterioration evaluating element 121 (FIG. 2/STEP 128). For example, a degree of similarity x between curves respectively representing the voltage response characteristics V(t) of the reference secondary battery 220 and the voltage response characteristics $V_{model}(t)$ of the secondary battery model is calculated. Then, according to a decreasing function f with the degree of similarity x as a main variable, the degree of deterioration $D(q_1)$ of the reference secondary battery 220 is calculated as degree of deterioration $D(q_1)=f(x)$. Here, "$q_1$" is an index representing the distinction among the types of reference secondary batteries 220.

(Multiple Regression Analysis)

Next, based on the respective degrees of deterioration $D(q_1)$ of plural reference secondary batteries 220 and respective values of plural model parameters $R_0$, $a_{i1}$, $b_{i0}$, $b_{i1}$, $h_k$, $L_0$, and T associated with one another and recognized by the first recognition element 111, multiple regression analysis is executed by the multiple regression analysis element 130 (FIG. 2/STEP 130).

Specifically, a multiple regression equation is defined by executing the multiple regression analysis using the degree of deterioration $D(q_1)$ of the reference secondary battery 220 as a target variable and the plural model parameters as explanatory variables. For example, a regression equation is defined using, as explanatory variables, plural model parameters that make up each of different plural model parameter groups extracted from all the model parameters ($R_0$, $a_{11}$, $a_{21}$, ... $a_{i1}$, ..., $a_{m1}$, $b_{10}$, $b_{20}$, ..., $b_{m0}$, $b_{11}$, $b_{12}$, ..., $b_{1m}$, $h_1$, $h_2$, ..., $h_n$, $L_0$, T) that define respective secondary battery models. Each of plural model parameter groups is composed of model parameters two or more and (3m+n+3) or less different. In each of plural multiple regression equations, the value of a multiple correlation coefficient or a coefficient of determination is evaluated. Then, some of the multiple regression equations in each of which the value of the multiple correlation coefficient or the coefficient of determination is relatively large are selected. For example, the multiple regression analysis element 130 selects one or more multiple regression equations having some of explanatory variables among plural explanatory variables $a_{i1}$, $b_{i0}$, $b_{i1}$, and $h_k$.

(Identification of Model Parameters Defining Secondary Battery Model)

Further, the measurement result of the complex impedance Z of the target secondary battery 420 is recognized by the second recognition element 112 (FIG. 2/STEP 132). The complex impedance Z of the target secondary battery 420 is measured by the AC impedance method, and the measurement result is registered in the database 10 in association with an identifier for identifying the type of target secondary battery 420, or transmitted from the target device 400 to the battery state determination device 100.

Based on the measurement result of the complex impedance Z of the target secondary battery 420, each of the plural model parameters that define a secondary battery model is identified by the second recognition element 112, respectively (FIG. 2/STEP 134). This secondary battery model is a model representing the voltage V(t) output from the target secondary battery 420 when the current I(t) is input to the target secondary battery 420. The voltage V(t) of the target secondary battery 420 is defined by the above-mentioned relational expression (01) using the transfer function H(t) between the open-circuit voltage OCV and the internal resistance.

(Degree-of-Deterioration Evaluation of Target Secondary Battery)

Based on respective values of the plural model parameters identified by the second recognition element 112, a degree of deterioration $D(q_2)$ of the target secondary battery 420 is evaluated by the second degree-of-deterioration evaluating element 122 according to the multiple regression equation(s) defined by the multiple regression analysis element 130 (FIG. 2/STEP 136). "$q_2$" is an index representing the distinction among the types of target secondary batteries 420. When plural multiple regression equations are used, the average of theoretical values of the plural multiple regression equations, the highest value, or the lowest value may be evaluated as the degree of deterioration $D(q_2)$ of the target secondary battery 420.

(Generation and Providing of Deterioration Diagnosis Information of Target Secondary Battery)

Deterioration diagnosis information $Info(D(q_2))$ is generated by the information providing element 140 according to the degree of deterioration $D(q_2)$ of the target secondary battery 420 (FIG. 2/STEP 138). Then, the deterioration diagnosis information Info $(D(q_2))$ is transmitted by the information providing element 140 from the battery state determination device 100 to the target device 400 (FIG. 2/STEP 140).

In the target device 400, the deterioration diagnosis information Info $(D(q_2))$ is received by a receiver that constructs the input interface 401 (FIG. 2/STEP 222). The deterioration diagnosis information $Info(D(q_2))$ is output to and displayed on a display device that constructs the output interface 402 (FIG. 2/STEP 224). Thus, in addition to a graph display representing the degree of deterioration $D(q_2)$ of the target secondary battery 420, a message about a coping method according to the degree of deterioration $D(q_2)$ such as a message saying "The degree of deterioration of the battery is 30%. It is recommended that you replace the battery in 150 days." is displayed.

Other Embodiments of Present Invention

In the aforementioned embodiment, a secondary battery model is selected by taking into account the temperature Θ when measuring the voltage response characteristics V(t) of the reference secondary battery 220, and the degree of deterioration $D(q_1)$ of the reference secondary battery 220 is evaluated. On the other hand, as another embodiment, the secondary battery model may be selected based on the identifier $q_1$ representing the type without taking into account the temperature Θ when measuring the voltage response characteristics V(t) of the reference secondary battery 220, and the degree of deterioration $D(q_1)$ of the reference secondary battery 220 may be evaluated. Similarly, in the aforementioned embodiment, the secondary battery model is selected by taking into account the temperature Θ when measuring the voltage response characteristics V(t) of the target secondary battery 420, and the degree of deterioration $D(q_2)$ of the target secondary battery 420 is evaluated. On the other hand, as still another embodiment, the secondary battery model may be selected based on the identifier $q_2$ representing the type without taking into account the temperature Θ when measuring the voltage response characteristics V(t) of the target secondary battery 420, and the degree of deterioration $D(q_2)$ of the target secondary battery 420 may be evaluated.

Further, the deterioration diagnosis information $Info(D(q_1))$ according to the degree of deterioration $D(q_1)$ of the reference secondary battery 220 may be generated by the information providing element 140, and transmitted from the battery state determination device 100 to the reference device 200. After that, in the reference device 200, the deterioration diagnosis information $Info(D(q_1))$ may be output to and displayed on the display device that constructs the reference output interface 202.

EFFECT OF INVENTION

According to the battery state determination device 100 and the battery state determination method executed by the battery state determination device 100 of the present invention, multiple regression analysis is executed by using, as explanatory variables, respective values of plural model parameters that define a secondary battery model based on the measurement result of the complex impedance Z of the reference secondary battery 220, and the degree of deterioration $D(q_1)$ evaluated according to the secondary battery model as a target variable (see FIG. 2/STEP 130). Then, according to the multiple regression equation obtained as a result of the multiple regression analysis, the degree of deterioration $D(q_2)$ of the target secondary battery 420 is evaluated (see FIG. 2/STEP 136). Thus, the evaluation accuracy of the degree of deterioration $D(q_2)$ of the target secondary battery 420 can be improved.

DESCRIPTION OF REFERENCE NUMERALS

10 . . . database, 100 . . . battery state determination device, 111 . . . first recognition element, 112 . . . second recognition element, 121 . . . first degree-of-deterioration evaluating element, 122 . . . second degree-of-deterioration evaluating element, 130 . . . multiple regression analysis element, 140 . . . information providing element, 200 . . . reference device, 202 . . . input interface, 204 . . . output interface, 210 . . . control unit, 220 . . . reference secondary battery, 230 . . . sensor group, 400 . . . target device, 402 . . . input interface, 404 . . . output interface, 410 . . . control unit, 420 . . . target secondary battery, 430 . . . sensor group.

The invention claimed is:

1. A battery state determination device comprising:
a hardware processor configured to:
recognize, based on measured values including a voltage response characteristic and complex impedance of a plurality of reference secondary batteries manufactured to the same specifications, the voltage response characteristic being measured based on sensor signals output while an impulse current is applied to each of the plurality of reference secondary batteries, a degree of deterioration of each of the plurality of reference secondary batteries, and respective values of plural model parameters that define a secondary battery model representing internal resistance characteristics of each of the plurality of reference secondary batteries in association with each other;

define a multiple regression equation by executing multiple regression analysis using the degree of deterioration of each of the plurality of reference secondary batteries as a target variable and the plural model parameters as explanatory variables based on the degree of deterioration of each of the plurality of reference secondary batteries and the respective values of the plural model parameters recognized in association with each other;

recognize respective values of the plural model parameters based on an impedance measurement result of a target secondary battery manufactured to the same specifications as each of the plurality of reference secondary batteries;

evaluate a degree of deterioration of the target secondary battery according to the defined multiple regression equation based on the recognized respective values of the plural model parameters;

generate deterioration diagnosis information according to the evaluated degree of deterioration of the target secondary battery, the deterioration diagnosis information including (i) a visual representation of the evaluated degree of deterioration of the target secondary battery, and (ii) a message about a coping method related to the target secondary battery recommending that a user replace the target secondary battery within a specified time period determined based on the degree of deterioration of the target secondary battery in order to avoid failure of operation of a target device that uses the target secondary battery as a power supply; and output the generated deterioration diagnosis information to a display device to be displayed on the display device, wherein, in defining the multiple regression equation, the hardware processor is configured to define each of a plurality of multiple regression equations using, as explanatory variables, plural model parameters that make up each of different plural model parameter groups extracted from all model parameters that define the secondary battery model, evaluate a value of a multiple correlation coefficient or a coefficient of determination for each of the plurality of multiple regression equations, select some of multiple regression equations in each of which the value of the multiple correlation coefficient or the coefficient of determination is relatively large, and evaluate the degree of deterioration of the target secondary battery according to some of the selected multiple regression equations.

2. The battery state determination device according to claim 1, wherein the secondary battery model is defined by a transfer function containing a parallel combination of a transfer function $H_0(z)$ of a resistor $R_0$ defined by a relational expression (10), a transfer function $H_i(z)$ (i=1, 2, ..., m) of an IIR system defined by a relational expression (11), and a transfer function $Hw(z)$ of an FIR system defined by a relational expression (12), where $$H_0(z)=R_0 \qquad (10),$$

$$H_i(z)=(b_{i0}+b_{i1}z^{-1})/(1+a_{i1}z^{-1}) \qquad (11), \text{ and}$$

$$Hw(z)=\Sigma_{k=0}^{n}h_k z^{-k} \qquad (12), \text{ and}$$

the hardware processor selects multiple regression equations having some of explanatory variables among plural explanatory variables $a_{i1}$, $b_{i0}$, $b_{i1}$, and $h_k$ as some of the multiple regression equations.

3. The battery state determination device according to claim 2, wherein the hardware processor is further configured to:
identify the respective values of the plural model parameters of the secondary battery model based on a measurement result of the complex impedance of each of the reference secondary batteries, calculate the degree of deterioration of each of the reference secondary batteries based on a comparison result between (i) the voltage response characteristic of the corresponding reference secondary battery, the voltage response characteristic being obtained based on a measured output voltage as a measurement result of a changing state of a voltage output from the reference secondary battery when the impulse current is input to the reference secondary battery in an initial state, and (ii) a voltage response characteristic obtained based on a model output voltage as a measurement result of a changing state of a voltage output from the secondary battery model when the impulse current is input to the secondary battery model in which the identified values of the plural model parameters are utilized, recognize the evaluated degree of deterioration of each of the reference secondary batteries, and identify the respective values of the plural model parameters of the secondary battery model based on a measurement result of complex impedance of the target secondary battery.

4. The battery state determination device according to claim 3, wherein the hardware processor is configured to:
recognize, for each reference secondary battery, a measurement result of complex impedance at each of different temperatures of the reference secondary battery, identify, for each reference secondary battery, a temperature dependence of the respective values of the plural model parameters based on the measurement result of complex impedance at each of the different temperatures of the reference secondary battery, recognize, for each reference secondary battery, a measurement result of temperature of the reference secondary battery in addition to the voltage response characteristic of the reference secondary battery, recognize a model output voltage output from the secondary battery model, in which the values of the plural model parameters are identified and the temperature dependence of the respective values of the plural model parameters is identified, when the measurement result of the temperature of the reference secondary battery is input in addition to the impulse current, and identify the respective values of the plural model parameters of the secondary battery model based on a measurement result of temperature of the target secondary battery in addition to the measurement result of complex impedance of the target secondary battery.

5. A battery state determination method executed by a hardware processor, the method comprising:
recognizing, based on measured values including a voltage response characteristic and complex impedance of a plurality of reference secondary batteries manufactured to the same specifications, the voltage response characteristic being measured based on sensor signals output while an impulse current is applied to each of the plurality of reference secondary batteries, a degree of deterioration of each of the plurality of reference secondary batteries, and respective values of plural model parameters that define a secondary battery model representing internal resistance characteristics of each of the plurality of reference secondary batteries in association with each other;

defining a multiple regression equation by executing multiple regression analysis using the degree of deterioration of each of the plurality of reference secondary batteries as a target variable and the plural model parameters as explanatory variables based on the degree of deterioration of each of the plurality of reference secondary batteries and the respective values of the plural model parameters recognized in association with each other;

recognizing respective values of the plural model parameters based on an impedance measurement result of a target secondary battery manufactured to the same specifications as each of the plurality of reference secondary batteries; and evaluating a degree of deterioration of the target secondary battery according to the defined multiple regression equation based on the recognized respective values of the plural model parameters;

generating deterioration diagnosis information according to the evaluated degree of deterioration of the target secondary battery, the deterioration diagnosis information including (i) a visual representation of the evaluated degree of deterioration of the target secondary battery, and (ii) a message about a coping method related to the target secondary battery recommending that a user replace the target secondary battery within a specified time period determined based on the degree of deterioration of the target secondary battery in order to avoid failure of operation of the target device; and outputting the generated deterioration diagnosis information to a display device to be displayed on the display device, wherein the defining the multiple regression equation comprises defining each of a plurality of multiple regression equations using, as explanatory variables, plural model parameters that make up each of different plural model parameter groups extracted from all model parameters that define the secondary battery model, evaluating a value of a multiple correlation coefficient or a coefficient of determination for each of the plurality of multiple regression equations, selecting some of multiple regression equations in each of which the value of the multiple correlation coefficient or the coefficient of determination is relatively large, and evaluating the degree of deterioration of the target secondary battery according to some of the selected multiple regression equations.

6. A battery state determination system comprising:
a plurality of reference devices each including:
a reference secondary battery,
a pulse current generator configured to input an impulse current to the reference secondary battery, and
a sensor group configured to output sensor signals for measuring a voltage response characteristic and complex impedance of the reference secondary battery, the voltage response characteristic being measured based on sensor signals output while the impulse current is applied;

a target device including:
a target secondary battery manufactured to the same specifications as the reference secondary batteries,
a sensor group configured to output sensor signals for measuring a complex impedance of the target secondary battery, and
a display device; and
the battery state determination device according to claim 1,
wherein the hardware processor of the battery state determination device is configured to receive the measured values from the plurality of reference devices for the plurality of reference secondary batteries, to receive the impedance measurement result from the target device based on the measured complex impedance of the target secondary battery, to generate the deterioration diagnosis information with respect to the target secondary battery of the target device, and to output the deterioration diagnosis information, and
wherein the target device is configured to display the deterioration diagnosis information on the display device.

7. The battery state determination system according to claim 6, wherein the reference devices are any one of a personal computer, a mobile phone, a home appliance, or a mobile vehicle that uses the reference secondary battery as a power supply.

8. The battery state determination system according to claim 7, wherein the battery state determination device is installed in a reference device among the reference devices.

9. The battery state determination system according to claim 6, wherein the target device is any one of a personal computer, a mobile phone, a home appliance, or a mobile vehicle that uses the target secondary battery as a power supply.

10. The battery state determination system according to claim 7, wherein the battery state determination device is installed in the target device.

* * * * *